Jan. 19, 1971  G. DE BOER  3,555,698
METHOD AND DEVICE FOR PREPARING A FAST DISSOLVING POWDER
Filed Nov. 25, 1968
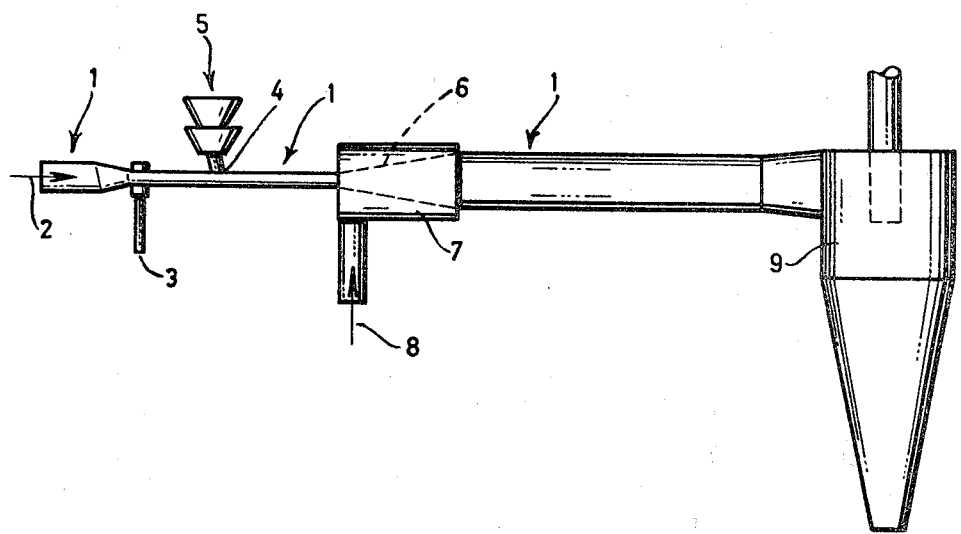
INVENTOR
GEERT DE BOER
BY
ATTORNEYS United States Patent Office 3,555,698
Patented Jan. 19, 1971

3,555,698
METHOD AND DEVICE FOR PREPARING A
FAST DISSOLVING POWDER
Geert de Boer, Lippenhuizen, Netherlands, assignor to
Machinenfabriek Stork-Volma N.V., Gorredijk, Netherlands
Filed Nov. 25, 1968, Ser. No. 778,665
Claims priority, application Netherlands, Dec. 1, 1967,
6716430
Int. Cl. F26b 3/00
U.S. Cl. 34—22                                4 Claims

ABSTRACT OF THE DISCLOSURE

A method and a device for preparing a fast dissolving (milk) powder by feeding a conventional powder into a previously moistened gas stream, flowing through a conduit and by subsequently mixing a warm drying gas into the powder/gas mixture, thereby maintaining a turbulent flow pattern throughout the conduit.

The invention relates to a method for preparing a fast dissolving powder, like for instance milk powder, starting from an already existing powder, this powder being carried along in a flow of moist gas, thereupon dried by a warm gas and finally separated from the gas. Such a method has already been suggested, since it is known that starting from, e.g., normal milk powder, obtained according to a spray-drying process, a quickly soluble powder can be prepared by moistening this milk powder during which, the particles agglomerate, whereupon the powder is dried. In this way a product with a coarse grain structure is obtained which can be easily moistened with water and as consequence, dissolve faster. This is a so called instant milk powder.

A method is described in the U.S. patent specification 2,934,434, whereby the powder is at first separated from a moist air current, before the drying air is supplied. Such a method has the drawback that a tacky powder must be separated from an air current, whereby rather big clods may be produced owing to caking, which are hard to dry and should then be ground again. Further there may also arise obstructions.

A method is furthermore described in the Netherlands patent specification 108,790 according to which the powder is suspended in an air-current and then moistened by means of water and/or steam. This method has the drawback that, on introducing water and/or steam into an air-current in which the powder is suspended, it is difficult to obtain a uniform distribution of moisture. In case of an irregular distribution of moisture, too wet particles may be obtained which, before giving off their excess moisture, can adhere to the wall and grow so as to form substantial clods. In this way, if the whole process is made to proceed in a rather narrow conduit, the wall of the conduit may become wet, which may give rise to clodding and/or obstruction.

It is an object of the invention to obviate these disadvantages, which object according to the invention is attained in that:

The powder is supplied to a previously moistened gas flow, whereupon the warm drying gas is supplied to this powder/gas mixture, and Both moistening and subsequent drying is effected in a continuous conduit, the gas stream being kept in a condition of turbulence.

Due to these features, the moisture is uniformly distributed in the air-current, while due to the greater velocity and turbulence of the gas flow, possible clods which would form on the wall as soon as they have a certain size, are blown away. The grains formed in this way have a more uniform size and can be easily dried without it being necessary to separate them first from the original moistening gas.

The method according to the invention, lends itself better to effect the complete process of moistening, agglomerating and drying—until the product is no longer tacky—in a rather narrow conduit, which allows for a fast progress of the process and a less expensive, easily to be cleaned, apparatus.

The velocity of the gas in the moistening phase, should preferably be at least 20 m./sec. in the method according to the invention.

It is a further object of the invention to obtain a device for performing the method described hereinbefore.

A still further object of the invention is to prevent any settlement of powder on the inner wall of the perforated part. This is of importance, because just in that portion the moisture content of the powder and consequently the tacking (holding) power is greatest.

The foregoing and other objects and advantages of the invention will appear in the description to follow. In the description reference is made to the accompanying drawings, which form a part hereof and in which are shown, by way of illustration and not of limitation, specific forms in which the invention may be embodied.

The device consists of a continuous conduit or pipe 1 provided with an inlet 2 for the gas and with a moistening means 3, embodied as a steam inlet. There is further a powder inlet 4, the capacity of which is regulated by a metering device 5, connected to the inlet 4. Next in the pipe 1, is a perforated and diverging part 6 around which a casing 7 is disposed with an inlet 8 for warm drying gas. The duct 1 opens into a cyclone 9 for separating the powder. The length of the pipe part 6 is at least equal to five times the diameter of the preceding portion of the conduit 1.

The device described hereinbefore is operated as follows: via the inlet 2 gas is supplied to the pipe 1 at a rate such that the flow velocity in the further part of the pipe 1 is at least 20 m./sec. Steam is introduced into this air via the inlet 3, so that the air is uniformly moistened. Hereupon, milk powder is introduced into this moistened gas, via the inlet 4 whereupon this mixture enters the pipe part 6 in a condition in which the milk powder particles are sufficiently moistened. Then the drying phase starts by the aid of a warm drying gas which is fed at 8. The velocity of the mixture remains at least 20 m./s., so that due to the turbulence produced, no growth or powder settlements can form on the inner wall. Finally, the instant milk powder is separated in the cyclone 9.

It is possible to reduce the moist content of the powder, after it has left the cyclone 9 still further, via, e.g., a fluid-bed dryer.

The most important advantage, obtained by the method according to the invention consists in that the milk powder is only fed to the gas flow after the gas is moistened, whereby in a single operation, a transition of ordinary milk powder (e.g., coming from a conventional milk vaporizer) into instant milk powder, is effected.

While a preferred embodiment of the invention has been shown and described, it is to be understood that changes and variations may be made without departing from the spirit and scope of the invention as defined in the appended claims.

What is claimed is:

1. Method for preparing a fast dissolving milk powder comprising the steps of:

(a) introducing milk powder particles into a stream of a previously moistened gas, whereby the moisture content of the milk powder is increased;

(b) introducing into and admixing with said gas stream containing said milk powder particles, a stream of a warm drying gas, said streams being maintained in a condition of turbulence in order to obtain a homogeneous mixture; and (c) recovering the dry milk powder.

2. The method of claim 1 in which the velocity of the gas stream in the moistening step (a) is at least 20 meters per second.

3. The method of claim 1 in which both the moistening and subsequent drying action is effected in a continuous conduit, providing a moistening zone and a drying zone, wherein warm drying gas is supplied through a perforated and diverging part of a conduit in the drying zone, and wherein the velocity of the gas stream within the drying zone is not less than two-thirds of the stream velocity in the moistening zone of said conduit.

4. Apparatus for preparing a fast dissolving powder comprising, in combination:

(a) a continuous conduit providing successively a moistening zone and a drying zone;

(b) an inlet for powder to be treated in communication with said moistening zone;

(c) means communicating with said moistening zone for supplying moisture thereto;

(d) inlet means for supplying a stream of gas to said conduit at the head of said moistening zone.

(e) a perforated conically widening part of said conduit connecting said moistening zone with said drying zone;

(f) a casing surrounding said perforated conically widening part and provided with an inlet for warm drying gas; and (g) cyclone means for cooling the dried powder, the length of said perforated and diverging part being at least five times the diameter of the preceding moistening zone portion of said conduit.

References Cited
UNITED STATES PATENTS 3,360,865   1/1968   Galle et al. _____ 34—19

CHARLES SUKALO, Primary Examiner